(No Model.)
W. HOLLIS.
POWER TRANSMITTER.
No. 436,081. Patented Sept. 9, 1890.
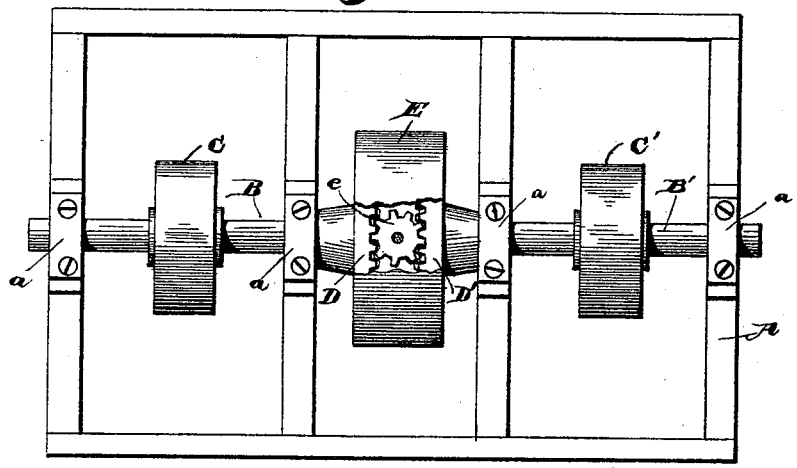
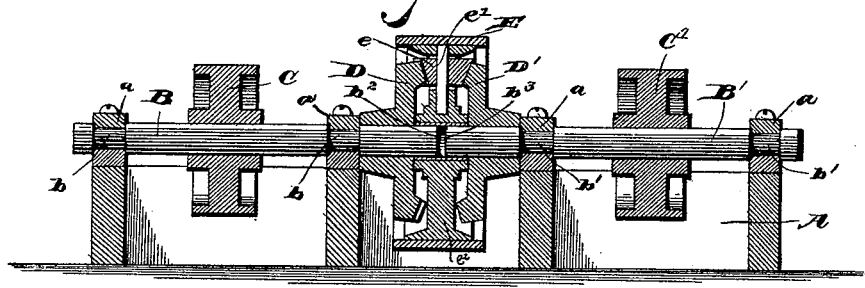
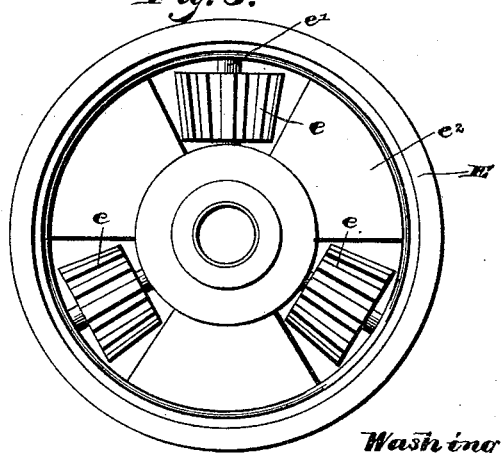
Witnesses
Samuel Kev.
J. Edgar Smith
Inventor
Washington Hollis
By his Attorneys,
C. A. Snow & Co.

UNITED STATES PATENT OFFICE.

WASHINGTON HOLLIS, OF PEMBROKE, KENTUCKY.

POWER-TRANSMITTER.

SPECIFICATION forming part of Letters Patent No. 436,081, dated September 9, 1890.

Application filed May 3, 1890. Serial No. 350,454. (No model.)

*To all whom it may concern:*

Be it known that I, WASHINGTON HOLLIS, a citizen of the United States, residing at Pembroke, in the county of Christian and State of Kentucky, have invented a new and useful Power-Transmitter, of which the following is a specification.

My invention is an equalizing power-transmitter.

The objects of my invention are to provide a gearing which will transmit power from two similar and nearly equal sources, the slight variations in the speed of said sources producing no strain upon themselves, the gearing, or the machinery to which the power is applied, to provide a gearing consisting of but few and simple parts, the same being durable and cheap of construction.

With these objects in view the invention resides in the various novel details of construction and in the combination of parts hereinafter fully described, and pointed out in the claims appended at the end of the specification.

In the drawings in which I have illustrated my invention and in which like letters and figures of reference indicate corresponding parts, Figure 1 is a plan view of my power-equalizer, the central or transmitting pulley having a part of its rim removed to show the bevel-wheels more clearly. Fig. 2 is a longitudinal section of the gearing. Fig. 3 is a side elevation of said transmitting-pulley, showing its parts in detail.

Referring to the drawings, A designates a base or frame-work, the same being provided with suitable journal-boxes $a$.

B B' are shafts having journal-bearings $b\,b'$, which rest in the journal-boxes $a$. Fast upon the shafts B B' are two pulleys C C', through which power is transmitted to the said shafts. Near the inner ends of the shafts B B' fast upon them are the bevel gear-wheels D D', beyond which the shafts project and nearly touch each other. I have indicated these inner ends of the shafts by $b^2\,b^3$.

E is the central or transmitting pulley. This pulley is loosely mounted upon the inner ends of the shafts B B', which I have designated as $b^2\,b^3$.

Loosely mounted on radial shafts $e'$ within the pulley E are a number of bevel pinion-wheels $e\,e\,e$, which when the pulley is in position mesh with the bevel gear-wheels D D'. Web-like spokes $e^2$ or spokes of any suitable construction connect the hub of the pulley E with the periphery or rim.

The operation of my gearing is as follows: From any sources powers are transmitted to the shafts B B' by means of the pulleys C C'. Now if the rates of speed of these powers be equal and if their direction be the same, the bevel gear-wheels D D' will revolve together and at equal rates. The bevel pinion-wheels $e\,e\,e$ within the pulley E meshing with these wheels D D' will hence be held from revolution by the teeth thereof, and will therefore cause the pulley E to revolve with the wheels D D' and at a rate of speed equal to theirs. Again, suppose the rates of speed of the two shafts to be the same but rotating in opposite directions. The bevel-pinions $e\,e\,e$ would revolve freely upon their shafts $e'$, which are radially placed within the pulley E, and the pulley E would remain stationary. Or, suppose the wheel D to revolve while the wheel D' is stationary. In this case the pinions $e\,e\,e$ would travel around the bevel-gear D' as around a circular rack, and the pulley E would revolve at half the speed of the wheel D. In case one shaft revolves at a rate of speed different from the other the revolution of the pulley E is a resultant of the two motions.

While I have described the various manners in which the revolutions of the shafts B B' affect the revolution of the pulley E, it is to be understood that the main object of my gearing is to transmit the sum of powers applied thereto when said powers move at or near the same rate of speed and in the same direction, and it is to be further understood that I have specified its operation under the influence of different rates of speed rather than different forces or powers for the sake of simplicity. The real effect of different rates of speed and different powers is readily seen from what has before been said, and, in fact, is a matter of mathematical calculation.

It will now be plain that in practical use my invention may be used as follows: When it is desirable to use more power for a certain machine than can be gotten with one engine, another is coupled with it by means of my equalizing gearing, and if variations or discrepancies do occur in the rates of their speed the said variations will not put undue stress or strain upon either engine, nor upon the machinery, nor upon the gearing itself.

Having fully described my invention, what I claim as new, and desire to secure by Letters Patent, is—

In a power-transmitter, the combination, with two shafts having their axes aligned, the said shafts nearly touching each other at their inner ends and having fixed bevel gear-wheels, of a transmitting-pulley situated between and having its periphery covering the said bevel gear-wheels loosely mounted upon the inner ends of both shafts and provided with bevel-pinions loosely mounted upon shafts radially arranged within said pulley and meshing with the aforesaid bevel-wheels, substantially as and for the purpose described.

In testimony that I claim the foregoing as my own I have hereto affixed my signature in presence of two witnesses.

WASHINGTON HOLLIS.

Witnesses:
JNO. P. CAMPBELL,
J. E. MCPHERSON.